United States Patent
Ehrhart

(10) Patent No.: US 9,365,099 B1
(45) Date of Patent: Jun. 14, 2016

(54) COMPACT, FOLDABLE, WEATHER PROTECTIVE COVER

(71) Applicant: Shaun Ehrhart, Owasso, OK (US)

(72) Inventor: Shaun Ehrhart, Owasso, OK (US)

( * ) Notice: Subject to any disclaimer, the term of this patent is extended or adjusted under 35 U.S.C. 154(b) by 183 days.

(21) Appl. No.: 13/775,680

(22) Filed: Feb. 25, 2013

Related U.S. Application Data

(60) Provisional application No. 61/603,034, filed on Feb. 24, 2012.

(51) Int. Cl.
*B60J 1/20* (2006.01)
*B60J 11/00* (2006.01)

(52) U.S. Cl.
CPC ........................ *B60J 11/00* (2013.01)

(58) Field of Classification Search
CPC ...... B65D 81/3886; B65D 25/34; A61G 5/10; B62D 1/06; E04G 21/30
USPC ........ 150/154–168; 135/118, 96, 66, 74, 126; 160/107, 135, 220, 229.1, 230, 231.1; 296/136.02, 136.04, 136.13, 65.17, 296/95.1, 97.7; 383/99, 95, 97
See application file for complete search history.

(56) References Cited

U.S. PATENT DOCUMENTS

| | | | | |
|---|---|---|---|---|
| 3,086,585 A | * | 4/1963 | Stark | 160/231.2 |
| 5,292,060 A | * | 3/1994 | Focke | B65D 11/1846 220/683 |
| 5,375,641 A | * | 12/1994 | Schlueter | 160/135 |
| 6,056,347 A | * | 5/2000 | D'Adamo | B60J 11/00 296/136.02 |
| 6,711,766 B2 | * | 3/2004 | Monk | A47B 95/02 5/417 |
| 6,769,725 B2 | * | 8/2004 | Ko | B60J 11/06 160/370.21 |
| 7,350,772 B2 | * | 4/2008 | Legrand | A47D 13/065 160/135 |
| D624,768 S | * | 10/2010 | Clark | D6/332 |
| 8,146,984 B2 | * | 4/2012 | Devereaux | B60J 11/00 150/166 |
| 8,430,445 B1 | * | 4/2013 | Williams | B60J 11/08 150/168 |
| 8,579,007 B2 | * | 11/2013 | Pottmeyer | A01M 31/025 160/135 |
| 2011/0095561 A1 | * | 4/2011 | Li | B60J 11/04 296/136.13 |

* cited by examiner

*Primary Examiner* — Fenn Mathew
*Assistant Examiner* — Cynthia Collado
(74) *Attorney, Agent, or Firm* — GableGotwals

(57) ABSTRACT

A protective cover has a first and a second section that have adjacent panels in the section connected to one another by a laterally oriented expandable joint. Each laterally oriented expandable joint in the second section is placed on an opposite side of the cover relative to its corresponding adjacent lateral expandable joint in the first section. Within each section, every odd-numbered laterally oriented expandable joint lies on a same face surface of the cover and every even-numbered laterally oriented expandable joint lies on the opposing face surface of the cover. The laterally oriented expandable joints permit accordion style folding and unfolding of the panels. A longitudinally oriented expandable joint connects the first section to the second section and permits compact folding of the second section onto the first section.

13 Claims, 4 Drawing Sheets

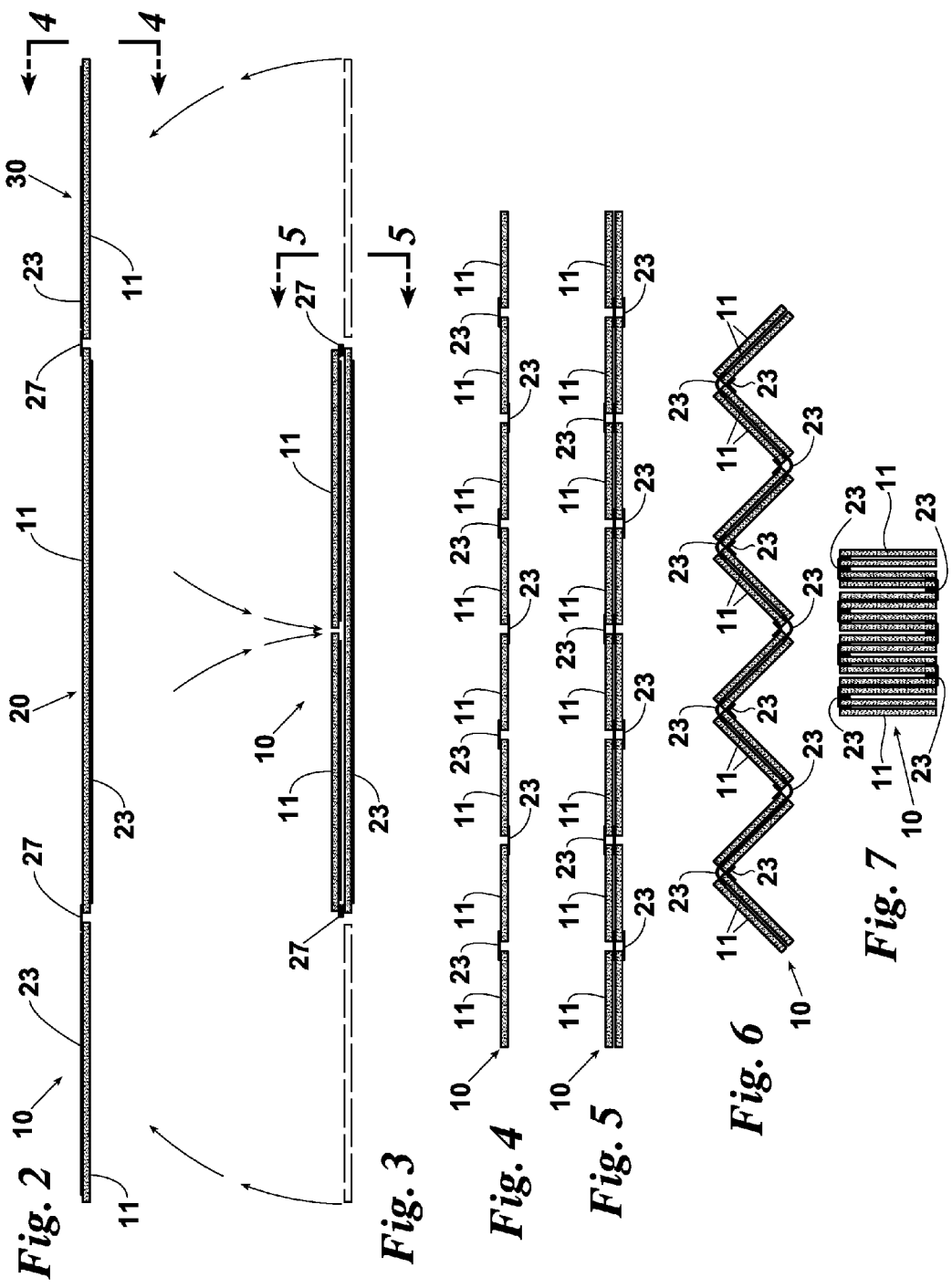

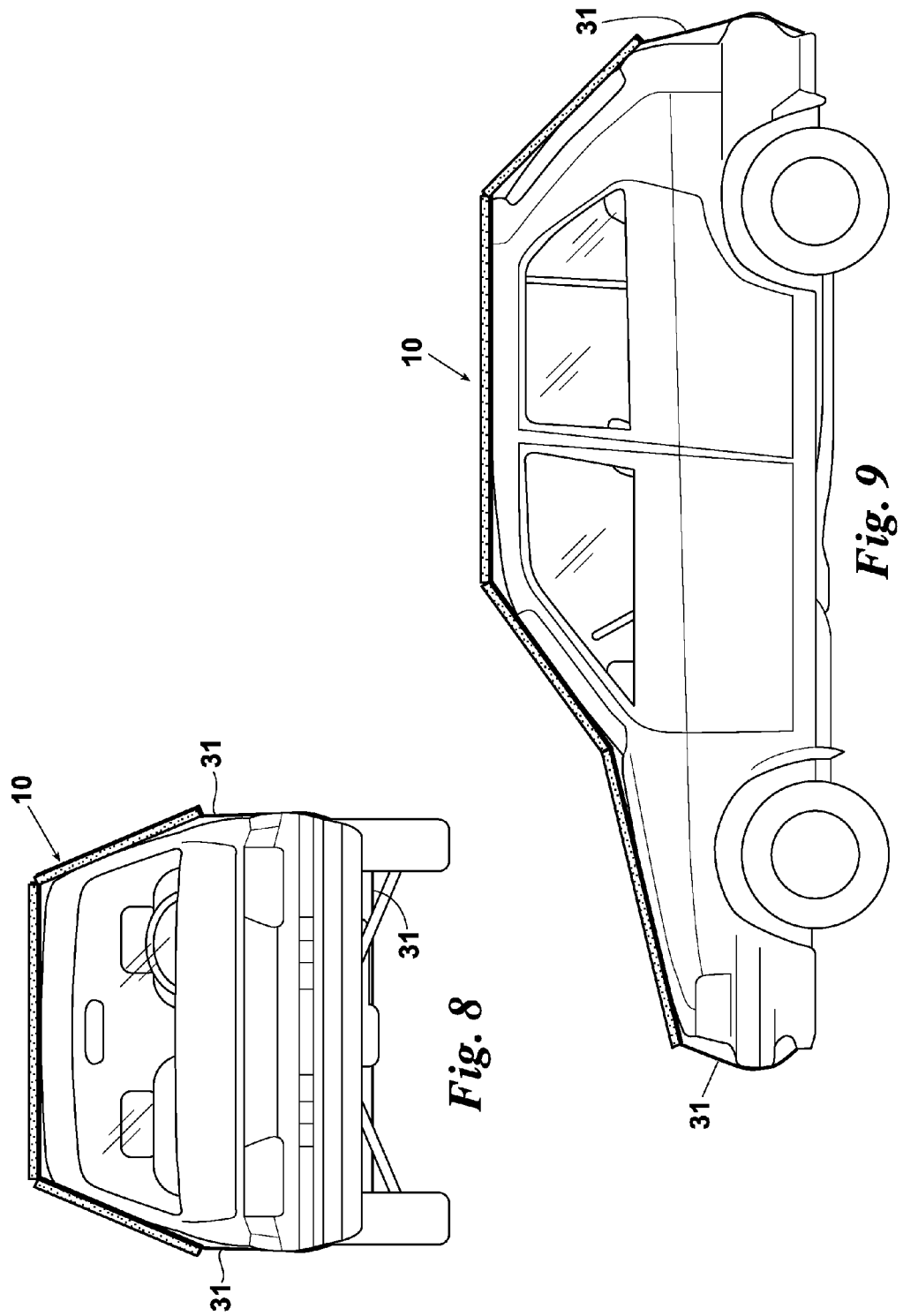

COMPACT, FOLDABLE, WEATHER PROTECTIVE COVER

CROSS-REFERENCE TO APPLICATIONS

This application claims priority to U.S. Pat. Appl. No. 61/603,034, filed on Feb. 24, 2012.

BACKGROUND OF THE INVENTION

This invention relates generally to covers used to protect motor vehicles from storm damage. More specifically, the invention relates to covers that can be stowed and then deployed to cover a motor vehicle and protect the vehicle from hail damage.

Prior art covers do not stow or fold into a small, storable size, nor can they be quickly deployed to protect motor vehicles from hail damage. These covers range from fitted car covers which are made with foam or multiple layers of different materials to covers that attach to framing placed about the vehicle or that expand around the vehicle when inflated with air or exhaust. The covers do not fold or stow easily and attempts to make the covers more compact when stowed also make them less effective in absorbing shock and preventing damage. Additionally, the covers do not conform to the surface being protected.

A need exists for a cover which can be quickly deployed and stowed, provides effective protection from hail damage when in use, conforms to the surface being protected, and is compact in size when stowed.

SUMMARY OF THE INVENTION

A protective cover made according to this invention includes a first section having a plurality of panels, with each panel in the plurality of panels having a core material and being connected to an adjacent panel by a laterally oriented expandable joint. Every odd-numbered laterally oriented expandable joint lies on a same face surface of the protective cover; every even-numbered laterally oriented expandable joint being on the opposing face surface of the protective cover. The laterally oriented expandable joints permit accordion style folding and unfolding of the panels to move the cover between a stowed state and a deployed state.

A second section may be added with the same type of laterally oriented expandable joint arrangement, with each laterally oriented expandable joint being on an opposite face surface relative to its corresponding adjacent laterally oriented expandable joint of the first section. Each panel of the first section is connected to an opposing panel of the second section by a longitudinally oriented expandable joint, with each even- and odd-numbered longitudinally oriented expandable joints being on a same face surface of the protective cover. The longitudinally oriented expandable joints permit the second section to fold-over the first section.

Because of the expandable joints and their arrangement, the protective cover easily moves between a stowed state and a deployed state. When in the stowed state, the cover is compact, having a length no greater than a length of a panel in the plurality of panels of the first section. Its height is no greater than the combined thickness of the panels in the section.

The protective cover can include means for securing the protective cover to an object, the securing means being in communication with at least one panel in the plurality of panels of either the first or second section (or both).

The protective cover can also include an outer shell which envelopes the core material and protects the core material from the effects of weather. This outer shell may be formed as a pocket which receives the core material. The core material itself is preferably a thin-walled, column-style material or a closed-cell foam material, and can be in a range of ⅛ inch to 2 inches thick. There is no requirement that the core material be the same in the first and second sections, and it may differ from panel to panel within each section.

BRIEF DESCRIPTION OF THE DRAWINGS

FIG. 2 is a section view taken along section line 2-2 of FIG. 1. A longitudinally extending joint joins each side flap to the center flap and allows the side flaps to rotate up about 180° degrees so that each side flap covers about half the width of the center flap.

FIG. 3 is a side view of the cover of FIG. 1 showing the side flap folded over the center flap.

FIG. 4 is a side elevation view the cover of FIG. 1. Within each section, a transverse joint connects one panel to the next and allows the panels to fold relative to one another in an accordion-style fashion.

FIG. 5 is view of the folded cover of FIG. 3 taken along viewing line 5-5. A honeycombed-pattern material or other rigid or semi-rigid medium forms the core of each panel.

FIG. 6 is view of the cover of FIGS. 1 and 3 as it is being folded end-to-end in an accordion-like manner.

FIG. 7 is a view of the cover of FIG. 1 in its final folded and stowed state.

FIG. 8 is a view of the cover of FIG. 1 in its deployed state, covering a motor vehicle, and shown in cross section about the middle of the vehicle. Eyelets may be provided to receive a bungee-style cord for securing the cover to the vehicle. Alternatively, a lanyard/strap may be used which extends under the vehicle and attaches to the other side of the cover using hook-and-loop tape or a buckle.

FIG. 9 is a view of an alternate preferred embodiment of the cover of FIG. 1 having a single section and being in a deployed state.

ELEMENTS AND ELEMENT NUMBERING

Figure 1:
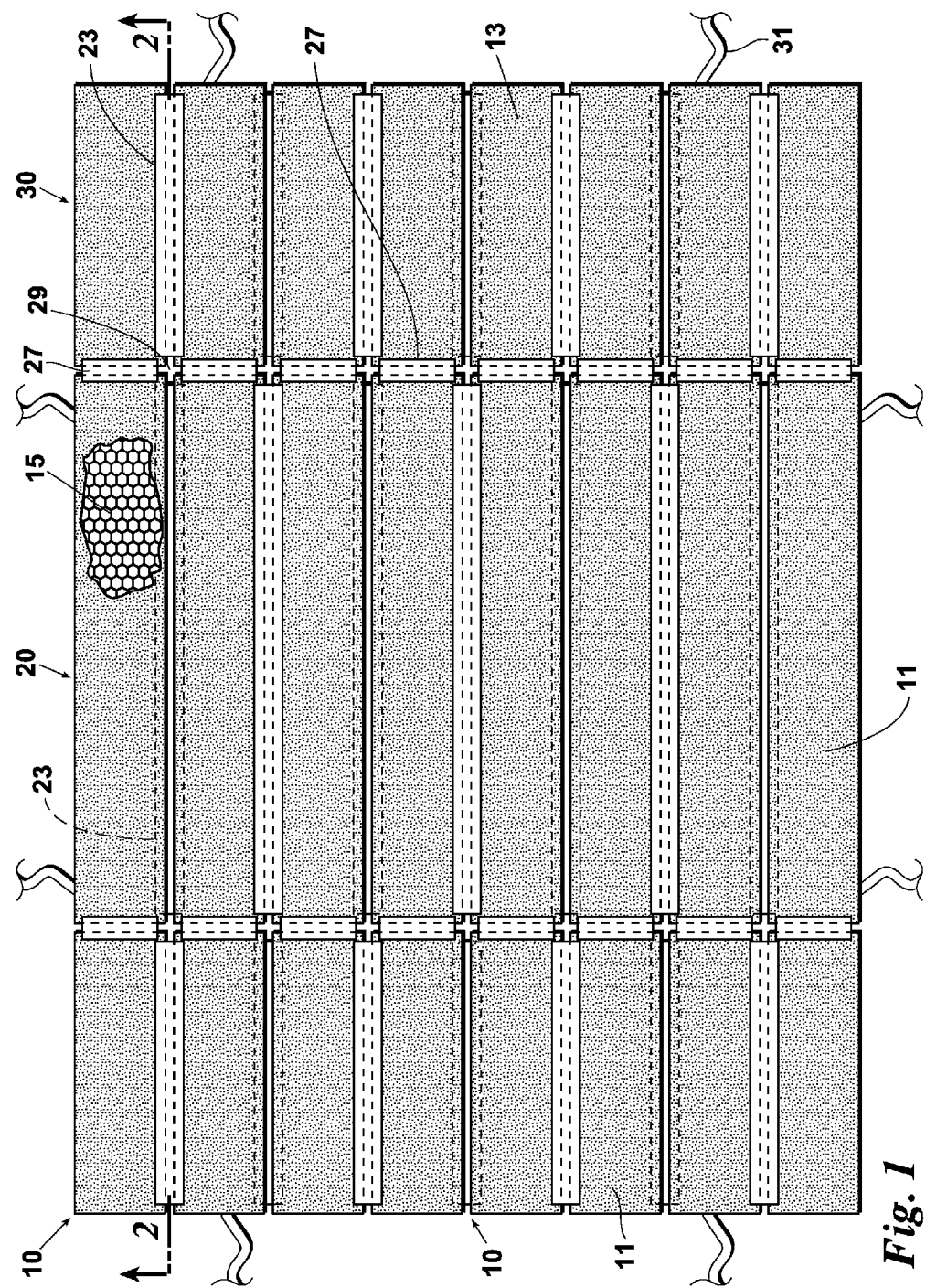
FIG. 1 is a top view of a preferred embodiment of a compact, foldable, weather protective cover made according to this invention. The cover includes a main or center-section panel ("the center flap") having a plurality of joined honeycombed or other rigid or semi-rigid panels and side-flap panels ("the side flap") connected to the center flap and having a plurality of joined honeycombed or other rigid or semi-rigid panels. The panels are enveloped in a weather-resistant fabric face sheet or shell such as a marine grade outdoor canvas or vinyl.

The elements used in the drawings and their associated numbering are as follows:
- 10 Compact, foldable, weather protective cover
- 11 Panel
- 13 Face sheet
- 15 Honeycomb core (or other rigid or semi-rigid medium such as, but not limited to, closed-cell polyethylene foam)
- 20 First or center-section flap ("the center flap")
- 23 First (lateral) expandable joint lying between same flap panels 11

27 Second (longitudinal) expandable joint lying between adjacent first and second flap panels 11

29 Gap between adjacent joints 27

30 Second or side-section flap ("the side flap" or "the side flaps")

31 Attachment (securing) means

DETAILED DESCRIPTION OF THE PREFERRED EMBODIMENTS

Referring to the drawings, and first to FIGS. 1-7, a compact, foldable, weather protective cover 10 made according to this invention includes a plurality of panels 11 joined one to the other by a second joint 27 to form a first flap (or first section) 20 and a second flap (or second section) 30, respectively. Preferably, adjacent panels 11 are abutted but may be spaced-apart.

In a preferred embodiment, first flap 20 is a center flap and second flap 30 is a left or right side flap. Within each flap 20, 30, the first joint 23 is a laterally extending joint that spans the spacing and alternates between the top and bottom side of adjacent panels 11 to permit accordion-style folding of the panels 11. Joint 23, 27 or both may be a scored face sheet, a sewn seam, or bonding strip that may be elastic in nature.

In a preferred embodiment, joints 23, 27 are constructed in such a way as to be expandable joints which permit opposing edge portions of two adjacent panels 11 to move away from one another when the two adjacent panels 11 are folded one on the other. The opposing edge portions are located along the same side of the folded panels 11 as the laterally expanded joint 23 or 27. For example, if the folded panels 11 are lying in a horizontal plane, the joint 23 or 27 permits vertical movement of the opposing edge portions, thereby separating the panels 11 from one another toward those edge portions but otherwise allowing the opposing face surfaces of the panels 11 to remain in contact with one another. Similarly, the joint 23 or 27 permit one of the folded panels 11 to move away from, yet still above (or below) the other panel 11 and remain parallel to it, thereby creating a space or gap between the two panels 11. In other words, the joint 23, 27 is expandable.

One of the unique structural features of cover 10 which contributes to its compact foldability is the alternating lateral joint 23 in the side (or second) flap 30 is located on the opposite side of the cover 10 or face 13 relative to its corresponding lateral joint 23 in the adjacent center (or first) flap 20 (see e.g., FIG. 1). This arrangement allows the side flaps 30 to nest in the center flap 20 when the side flaps 30 are folded over because the adjacent panels 11 between flaps 20, 30 are not joined are on the same side of the cover 10. Therefore, the panels 11 can more easily pull away from each other, greatly facilitating accordion folding.

Each panel 11 in the plurality of panels 11 has a weather- or water-resistant face sheet 13 as a cover. The face sheet 13 may be constructed as a pocket to receive core 15 and may be made out of any suitable weather- or water resistant material, preferably an outdoor canvas or vinyl.

The core 15 may be thin-walled column style (e.g., honeycombed or open cell closed-cell foam or other rigid or semi-rigid material. The core 15 is preferably a thin core, in the range of about ⅛ to ⅝ inches thick (but may be up to 2 inches thick), and absorbs shock from objects such as hail. The core 15, as well as the face sheet 13, may be constructed out of a polypropylene or other lightweight, resilient material. The panels 11 may be any shape preferable but a rectangular-shaped panel 11 is the preferred shape for automotive applications.

The number of panels 11 used for each flap 20, 30, and the dimension of each panel 11, determines the overall length "L" and width "W" of the cover 10. In one embodiment intended for automotive applications, each panel 11 used for the center flap 20 and side flap 30 has a minor dimension "d" of about 12 inches. The major dimension "D" of the center flap panels 11 is about 48 inches and that of the side flap panels 11 is about half that of the center flap panels 11. This allows the side flaps 30 to stow on top of (or below) center flap 20 when in the folded and stowed position and provides an overall length of the stowed cover 10 of about 48 inches.

In general terms, when the cover 10 is in a stowed state, it has a height no greater than about $2 \times (n) \times (t)$, where "n" is the number of panels 11 in one of the center or side flaps 20, 30 and "t" is the panel thickness of one panel 11 in the plurality of panels 11 of the flaps 20, 30, In its deployed state, the overall length L of cover 10 is about 192 inches (about 16 panels 11) and its overall width W is about 96 inches (one center flap 20 and two side flaps 30). Of course, the overall length L and width W of the cover may be may be any size preferable to provide adequate coverage of the exposed—or at-risk-of-damage—top and side surfaces of an object. For certain applications, such as but not limited to aircraft components (see e.g. FIG. 10), the cover 10 may include only center flap panel 11.

Each center flap panel 11 is connected to an opposing side flap panel 11 by a second (longitudinally oriented) joint 27. The second joint 27 extends about the same length as minor dimension "d" of the panel 11 and runs substantially parallel to it. Similar to the first joint 23, second joint 27 may be a scored face sheet, a sown seam, or a bonding strip that may be elastic in nature. A gap 29 lies between each adjacent second joint 27. Alternatively, second joint 27 may run the length of the cover 10.

When in use on a vehicle (see e.g. FIGS. 8 & 9), the center flap 20 generally covers the hood, roof and trunk portions of the vehicle, with the side flaps 30 generally covering the side panels and doors of the vehicle. Attachment means 31, such as bungee-style cords or straps/lanyards with hook-and-loop or buckle fastening means, may be used to secure the cover 10 to the vehicle or object being protected. Preferably, there are attachments means 31 such as a front, middle, and back strap. The front strap connects to the vehicle at about the forward side of the front wheel well, the center strap connects at about the middle of the vehicle, and the back strap connects about at the back side of the back wheel well.

Additional side flaps (not shown) can be added to each side flap panel 11. The one or more additional side flaps 30, which are preferably attached to the side flap panels 11 by a second joint 27 provide extra extension or coverage for taller vehicles like trucks and sports utility vehicles. The additional side flap or flaps 30 can be made of even thinner panels 11 because the force vector of impact to the additional flap 30 will not be normal to the vehicle.

The cover 10 can be easily stowed in the trunk of a motor vehicle and quickly deployed by a user for use as necessary. As mentioned above, the core 15 can be very thin (e.g., about ⅛ to ⅝ inch thick) yet provide the energy absorbing properties of column-buckling that is inherent to honeycomb or other closed-cell medium. For example, the cover 10 previously described for automotive applications has panels about 3/16 of an inch thick, making it about 6 inches tall when in the folded, stowed position. The total weight of the cover 10 excluding the face sheets 13 is about 10 pounds, and about 25 pounds when including the fabric face sheets 13.

In tests conducted by the inventor, a panel 11 using the thin honeycomb core 15 above was placed over a piece of sheet aluminum and hit with the rounded end of ball peen hammer. The aluminum suffered no damage. The inventor also fired frozen water balloons at the panel using an air cannon at a calculated terminal velocity. Again, the aluminum suffered no damage.

Figure 10:
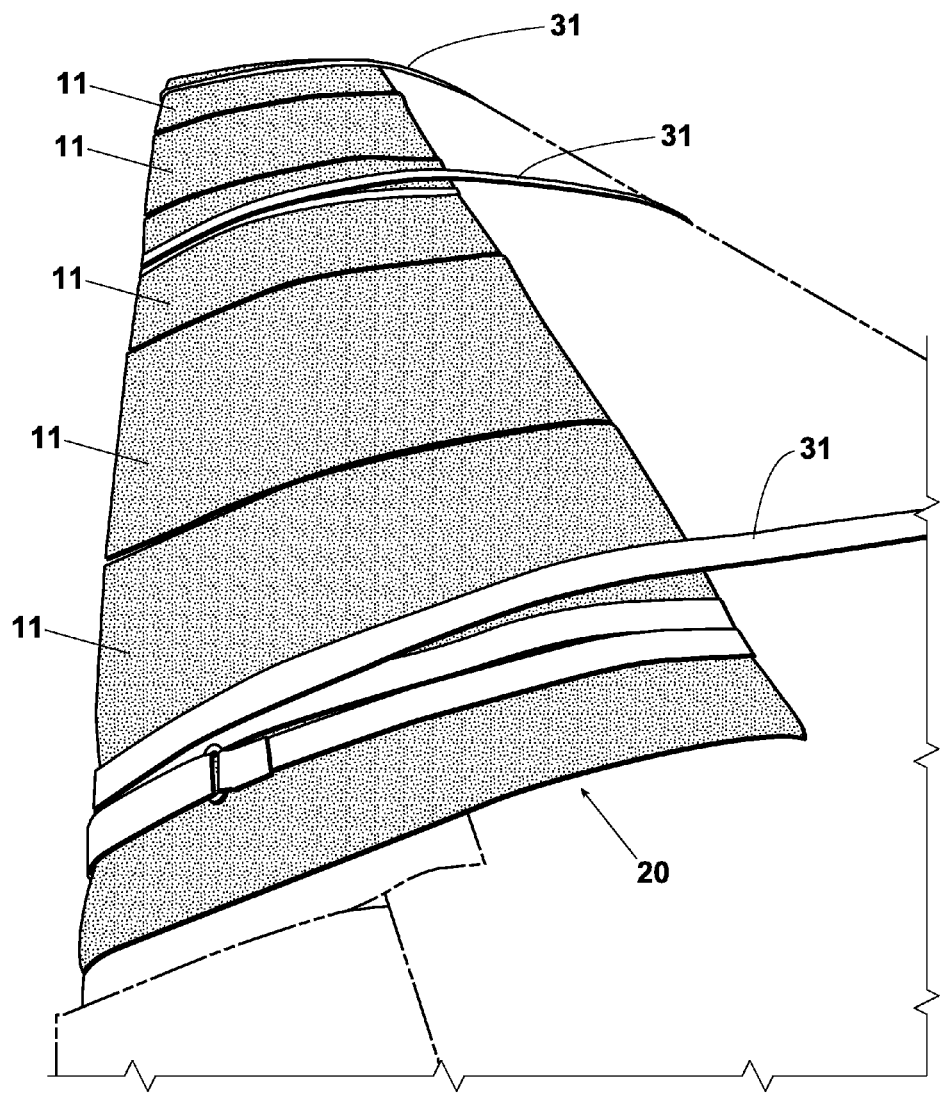
FIG. 10 is an isometric view of a preferred embodiment of a cover made according to this invention in a deployed state and protecting airplane flight controls.

Referring to FIG. 10, another example of a preferred embodiment of cover 10 is intended for use as an inboard aileron cover. The inboard aileron cover made according to this invention includes the following features:

1. A rectangular cover, 84 inches long×41 inches wide×1 inch deep, comprised of panels or pockets panels of marine grade outdoor canvas 8 oz or heavier and joined in such a fashion to allow for a final folded state dimension of approximately 41 inches long×17 inches wide×6 inches deep. (18 oz vinyl may be substituted for the 8 oz canvas.)
2. Pockets sealed by VELCRO® hook-and-loop fasteners on the trailing edge and lengthwise.
3. Two, 2-inch wide, 40-foot long, nylon straps sewn onto the top of the cover, each attached on an opposite ends of the cover, at a distance of about 2 to 4 inches from the out board edges of the cover and extending the entire width of the cover fore and aft. The last 1½ to 2 feet of each nylon strap has hook-style VELCRO® fastening means sewn onto the upper side of the strap and the next 3 to 5 feet of strap has loop-style VELCRO® fastening means sown onto the lower side of the strap.
4. Each of the nylon straps have a long tag end and a short tag end. The long tag end extends forward toward and around the leading edge of the wing and then rearward along the underside of the wing to connect itself cinch-style using the VELCRO® fastening means to the short tag end on the trailing edge side.
5. The panels or pockets are filled with 1-inch thick high grade, closed-cell polyethylene foam.
6. The color of the canvas or vinyl is red with one NAS1756-style "remove before flight streamers" attached at each end of the cover.

While preferred embodiments of a cover 10 made according to this invention have been described with a certain degree of detail, changes can be made in its actual construction without departing from the scope of the claims. For example, the cover 10 may include a single panel or section 11, and may be sized appropriately for aircraft composite flight controls that are often badly damaged by hail when parked on a tarmac, costing the airline industry millions a year in canceled flights, repairs, and new part orders.

What is claimed is:

1. A protective cover comprising:
   a first section and a second section each having a plurality of panels
   each panel in the plurality of panels including a core material and being connected to an adjacent panel of the plurality by a laterally oriented expandable joint having elasticity, every odd-numbered laterally oriented expandable joint of the first section and every even-numbered laterally oriented joint of the second section being on and having two ends directly connected to a same face surface of the protective cover, every even-numbered laterally oriented expandable joint of the first section and every odd-numbered laterally expandable joint of the second section being on and having two ends directly connected to an opposing face surface of the protective cover;
   each panel of the first section being connected to an opposing panel of the second section by a longitudinally oriented expandable joint, each even- and odd-numbered longitudinally oriented expandable joint being on a same face surface of the protective cover;
   wherein the longitudinally oriented expandable joints permit the second section to fold-over the first section; and
   wherein the laterally oriented expandable joints permit accordion style folding and unfolding of the panels to move the cover between a stowed state and a deployed state.

2. A protective cover according to claim 1 further comprising means for securing the protective cover to an object, the securing means being in communication with at least one panel in the plurality of panels.

3. A protective cover according to claim 1 wherein each laterally oriented expandable joint between two adjacent panels in the plurality of panels permits opposing edge portions of the two adjacent panels to move away from one another when the two adjacent panels are folded on one another, opposing edge portions being located along the same side of the folded panels as the laterally expandable joint.

4. A protective cover according to claim 1 further comprising an outer shell enveloping the core material, the outer shell being selected to protect the core material from the effects of weather.

5. A protective cover according to claim 1 further comprising the outer shell being formed as a pocket, the pocket receiving the core material.

6. A protective cover according to claim 1 further comprising the core material of at least one panel in plurality of panels being a thin-walled, column-style material.

7. A protective cover according to claim 1 further comprising the core material of at least one panel in the plurality of panels being a closed-cell foam material.

8. A protective cover according to claim 1 further comprising the core material of at least one panel in the plurality of panels being in a range of ⅛ inch to 2 inches thick.

9. A protective cover according to claim 1 wherein each laterally oriented expandable joint between two adjacent panels in the plurality of panels permits opposing edge portions of the two adjacent panels to move away from one another when the two adjacent panels are folded one on the other, the opposing edge portions being located along the same side of the folded panels as the laterally oriented expandable joint.

10. A protective cover according to claim 1 wherein a longitudinally oriented expandable joint between a panel of the first section and an adjacent panel of the second section receives an edge of an object to be covered, the panel of the first section conforming to one face surface of the object, the panel of the second section conforming to another face surface of the object.

11. A protective cover according to claim 1 wherein the protective cover in a stowed state has a width no greater than a width of a panel in the plurality of panels of at least one of the first and second sections.

12. A protective cover according to claim 1 wherein the protective cover in a stowed state folds to a size having a length no greater than a length of a panel in the plurality of panels of the first section.

13. A method of protecting an external surface of an object from damage, the method comprising the step of covering the object with a protective cover made according to claim 1.

* * * * *